United States Patent

[11] 3,572,940

| [72] | Inventor | Pierre Poubeau<br>Gif-sur-Yvette, France |
|---|---|---|
| [21] | Appl. No. | 700,423 |
| [22] | Filed | Jan. 25, 1968 |
| [45] | Patented | Mar. 30, 1971 |
| [73] | Assignee | Nord-Aviation Societe Nationale De<br>Constructions Aeronautiques<br>Paris, France |
| [32] | Priority | Jan. 27, 1967 |
| [33] | | France |
| [31] | | 92,877 |

[54] METHOD AND A DEVICE FOR MEASURING THE SIGHTING ERROR OF AN OPTICAL APPARATUS
7 Claims, 14 Drawing Figs.

[52] U.S. Cl. .................................................. 356/141
[51] Int. Cl. ........................................... G01b 11/26
[50] Field of Search ........................................... 356/141

[56] References Cited
UNITED STATES PATENTS

| 3,293,980 | 12/1966 | DeBenedetti | 356/141 |
| 3,000,255 | 9/1961 | Iddings | 356/141 |
| 2,949,672 | 8/1960 | Ostergren | 356/141 |

*Primary Examiner*—Rodney D. Bennett, Jr.
*Assistant Examiner*—Joseph G. Baxter
*Attorney*—Karl W. Flocks ABSTRACT: A method and a device for measuring the sighting error of an optical apparatus, particularly of a star sight for artificial satellites, in which the image of the star, formed on the focal plane of an optical apparatus, is detected by a detecting means associated with a time basis and detecting one signal varying as a function of the illumination of the detector, the said signal having an anomaly or discontinuity characteristic of the position of the image to be fixed, so as to constitute at least one detection signal and lead to one coordinate in a system of references associated with the above detector.

Patented March 30, 1971

Inventor:
Pierre Toubeau
By
Kazuo. Frocks
Attorney

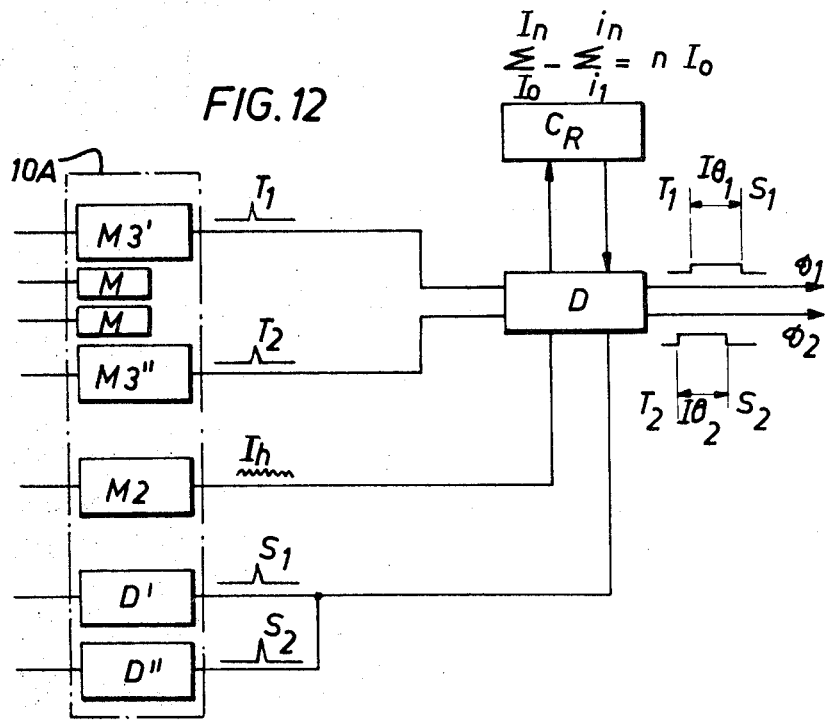

METHOD AND A DEVICE FOR MEASURING THE SIGHTING ERROR OF AN OPTICAL APPARATUS

The present invention relates to a method of measuring the sighting error on an optical apparatus, that is to say the instantaneous divergence between the direction of a sighted object and the optical axis of the said apparatus, this divergence advantageously being represented by that existing between the effective position of the image of the said sighted object in the focal image plane of the optical apparatus and the position which this image would have if the optical axis of the apparatus exactly coincided with the direction of the sighted object.

The present invention furthermore relates to a measuring device which carries out the above method and to optical sighting apparatus, in particular a star sight or a telescope for sighting artificial satellites, equipped with the above measuring device.

As has been briefly mentioned above, it is known to evaluate the sighting error due to the divergence of an optical apparatus by measuring in the focal image plane of the apparatus two polar or cartesian coordinates of the position of the image in a system of orthogonal reference axes. Thus, in a first type of known device, a diffraction grating formed by two orthogonal filiform detector gratings is disposed in the focal image plane of the optical apparatus, the detectors being independent but associated with each other so as to form a standard detector, the surface of the diffraction grating thus obtained being at least equal to or corresponding to that of the area or field to be explored. In this case, the position of coincidence of the two detectors which are simultaneously sensitized by the image thus enables the desired rectangular coordinates of the position of this image and consequently the measurement of the corresponding sighting error to be obtained. However, it is known that the resolution power of such a diffraction grating is low, because, on the one hand, it is necessary for each detector grating to have minimum dimensions and, on the other hand, the electronic amplification necessary for each of the gratings leads to a number of amplifiers which rapidly becomes prohibitive.

In another known method, a single detector is disposed in the focal image plane of the apparatus and then either two movable, orthogonally slitted masking systems, or a single movable mask having nonparallel slits is placed on this detector; noting of the instants when the above slits are in coincidence with the image enables an indication of the position of the image in an orthogonal axes system to be obtained. However, it is clear that the necessarily alternate movement of these masks and the noting of the above instants of coincidence present delicate problems, in particular of a mechanical nature, which have to be resolved.

In a third conventional method, it is known to form an image which is not pinpoint on a system having four detectors disposed in sectors, such that from the position of the illumination area on these sectors, an electrical voltage proportional to the decentering of the said area is produced. However, such a device necessarily has a relatively low precision since it measures an imbalance between the compared illumination values.

Finally, in another known process and the corresponding measuring devices, the image of the sighted object is formed on a detector constituted by an analyzing tube of the "Vidicon" type and suitable electronic scanning enables a detection signal to be produced in certain conditions, which signal has one or more characteristics enabling the position of the image on the detector to be deduced, the said characteristic being produced when the said electronic scanning beam encounters the image area. Although such a device provides accurate and rapid indications, the difficulties encountered in stabilizing the scanning beam, which is liable to deviate, and in putting into operation the corresponding electronic beam deviation equipment make this device delicate, complex and of limited accuracy.

The object of the present invention is therefore to provide a method and a corresponding device for measuring the sighting error of an optical apparatus, which do not have the disadvantages mentioned above, the operation of which and use of the data provided is facilitated and of which the accuracy of the measurements made is sufficient.

To this effect, the general method for measuring the sighting error of an optical apparatus, in particular of a star sight for artificial satellites, is essentially characterized by the fact that it consists in disposing at least one luminous flux detecting means in the immediate vicinity of the focal image plane of the optical apparatus, the surface of the said detecting means corresponding to the area or field to be explored, in producing a time basis formed by a series of timing pulses, in producing at least one initial position fixing signal or pip for counting the time intervals by means of the said timing pulses, and at least one signal varying as a function of the illumination of the said detector means, the said signal having at least one "anomaly" or discontinuity characteristic of the position of the image to be fixed, so as to constitute at least one detection signal, such that, in a system of reference axes associated with the above detection means two coordinates of the instantaneous position of the image or of the divergence due to the sighting error are determined, by measuring the time interval separating the appearance of the fixing signal or the initial position signal and the appearance of the detection signal or of the above-mentioned anomaly coming from the said detection means.

According to a first variation of the above method, the optical image of the apparatus is duplicated so as to produce two orthogonal images respectively on two detectors disposed near to the focal image plane of the apparatus and the centers of which are situated at 90° from each other with respect to the optical axis of the apparatus, two pips or initial position fixing signals and two variable signals coming respectively from the two above detectors being produced and associated such that, in the system of reference axes having two rectangular coordinates as mentioned above associated with detectors, the time interval or number of timing pulses separating the appearance of the position fixing signal and the appearance of the corresponding detection signal are respectively measured.

According to in second variation of the same method, the analysis of the position of the image is carried out in polar coordinates by means of a variable signal coming from a single detector, the center of which is disposed on the optical axis of the apparatus, the time interval separating the appearance of a position fixing signal from the appearance of a detection signal from a first discontinuity or anomaly in the above signal produced by the detector enabling a first coordinate to be measured, while the second coordinate is measured from the appearance of a second discontinuity in the same signal coming from the single detector.

Finally, the method according the to the invention, the measurement of the time intervals for determining the coordinates of the position of the image by counting the timing pulses, is advantageously effected by integration of a constant number $n$ of measurements by means of a normal counting register unit.

The device for measuring the sighting error of an optical apparatus, in particular of a star sight for artificial satellites, which puts into effect the above method according to the invention is essentially characterized by the fact that it includes a thin disc having alternately opaque and transparent sectors and at a constant speed, the said disc being disposed in the immediate vicinity of the focal image plane of the optical apparatus, so as to intercept the image beam thereof, a second disc rigid with the first, disposed below it and supporting a magnetic track onto which are impressed the regular magnetic traces or fixes read by a corresponding reading member so as to provide timing pulses, the said magnetic track carrying disc being rigidly driven in rotation with the first disc having the opaque and transparent sectors and the said magnetic track moreover having at least one fix or trace in order to constitute an initial position fixing signal, and at least one detection means or cell disposed in the immediate vicinity and beneath the disc having opaque and transparent sectors, the said detection means being associated with at least one reading member so as to furnish a detection signal which is variable as a function of the rotation of the disc having opaque and transparent sectors controlling the illumination produced on the said detection means or cell.

In accordance with other characteristics:

In a first preferred embodiment, the device includes a single cell, the center of which is situated on one of the reference axes of the coordinate system and the position fixing signal is produced when the corresponding mark or trace on the magnetic track coincides with the said axis; a thin disc having alternately opaque and transparent sectors and of which at least one of the opaque sectors constitutes a wide sector interrupting the luminous flow onto the cell so as to cause a first discontinuity in the detection signal, while the other opaque and transparent sectors are all of the same width but have an opaque zone and a transparent zone along the radial length of a same sector, the surface of the respective opaque and transparent zones varying from one sector to another in a continuous manner, such that the signal emitted by the said cell has a second discontinuity, formed particularly by inversion of the signals produced by the detector upon passage of the sector whose surface of separation between the two opaque and transparent zones corresponds to the polar line of the image position, such that from the position fixing signal and from the signal produced by the appearance on the cell of a wide opaque sector, the two polar coordinates of the position of the image on the single cell of the device are determined.

According to a second embodiment, the device includes a thin disc provided with sectors of the same width alternately and regularly opaque and transparent and with at least one wider opaque sector, in particular enabling the production of a discontinuity or anomaly in the sequence of pulses due to the other above-mentioned sectors, two cells or detection means, the respective centers of which are disposed in perpendicular directions, in the immediate vicinity of and under the disc having opaque and transparent sectors, each of the said cells producing a distinct measuring or detection signal associated with an initial position fixing signal, such that, by measuring the corresponding divergences between the said position fixing signals and the discontinuities of the detection signal, two rectangular coordinates of the position of the image furnished by the optical apparatus can be determined.

Finally, the present invention also provides, as a new industrial product, an optical sight or telescope intended in particular for sighting stars, principally on an artificial satellite, and in a general manner an optical sighting apparatus provided with a sighting error measuring device such as that described above, such an optical sight being characterized essentially by the fact that, according to a possible embodiment, it is constituted by an assembly, mounted in a single unit, of usual optical means constituting the said sight and a sighting error measuring device corresponding to the second embodiment, that is to say including essentially a thin transparent disc having alternate opaque and transparent sectors, this disc turning about a center disposed on the optical axis of the system, and two detectors or cells disposed orthogonally and receiving the two duplicated images coming from the above optical system, a disc carrying magnetic signals and fast with the first disc for being driven in rotation therewith about an axis parallel to or merged with the optical axis of the system, a motor device which is advantageously constituted by two windings for synchronously or asynchronously driving the two above discs and an assembly of reading heads or members providing, on the one hand, the timing signals and the position fixing signal and, on the other hand, the detection signals coming from each of the two cells of the sighting error measuring device.

Other advantages and characteristics of the present invention will be made clear below in the description which follows of the general principles of the method according to the invention for measuring the sighting error of an optical apparatus and of two preferred embodiments of the corresponding measuring device, intended in particular for star sights for artificial satellites or space vehicles, the said description being made in conjunction with the attached drawings, in which.

Figure 4:
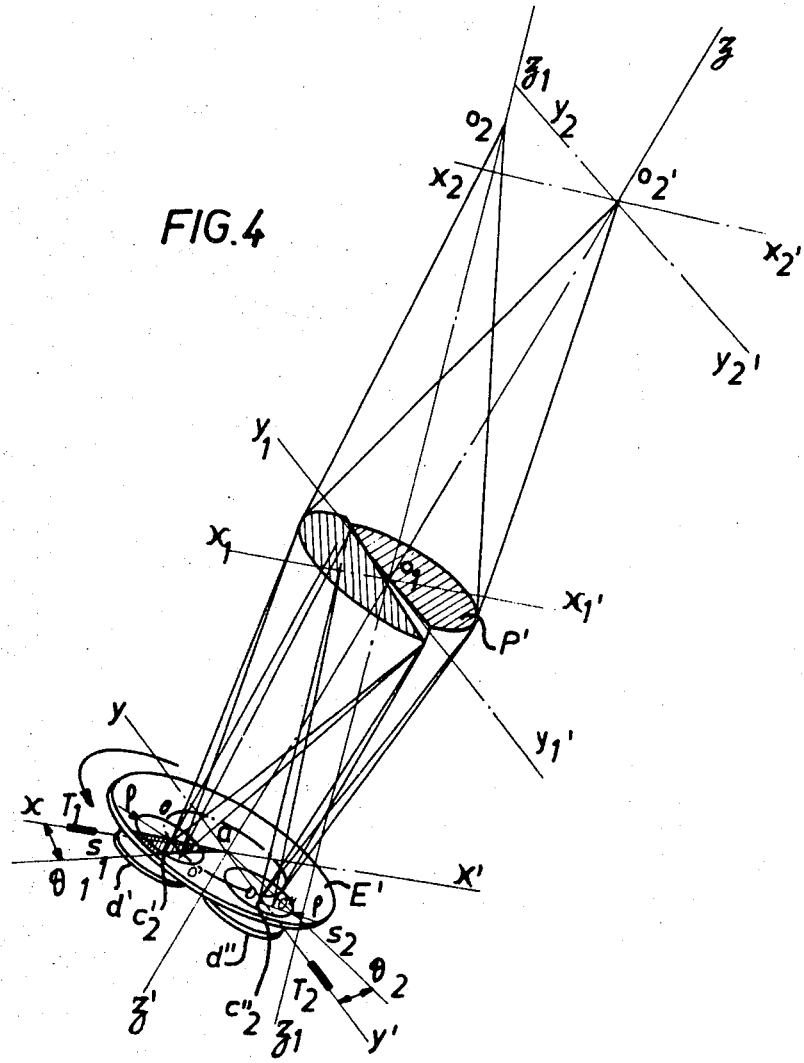
FIG. 4 is a schematic view in perspective intended to show the principle of a device for measuring the sighting error of an optical apparatus according to a first possible embodiment of the invention.
Figure 8:
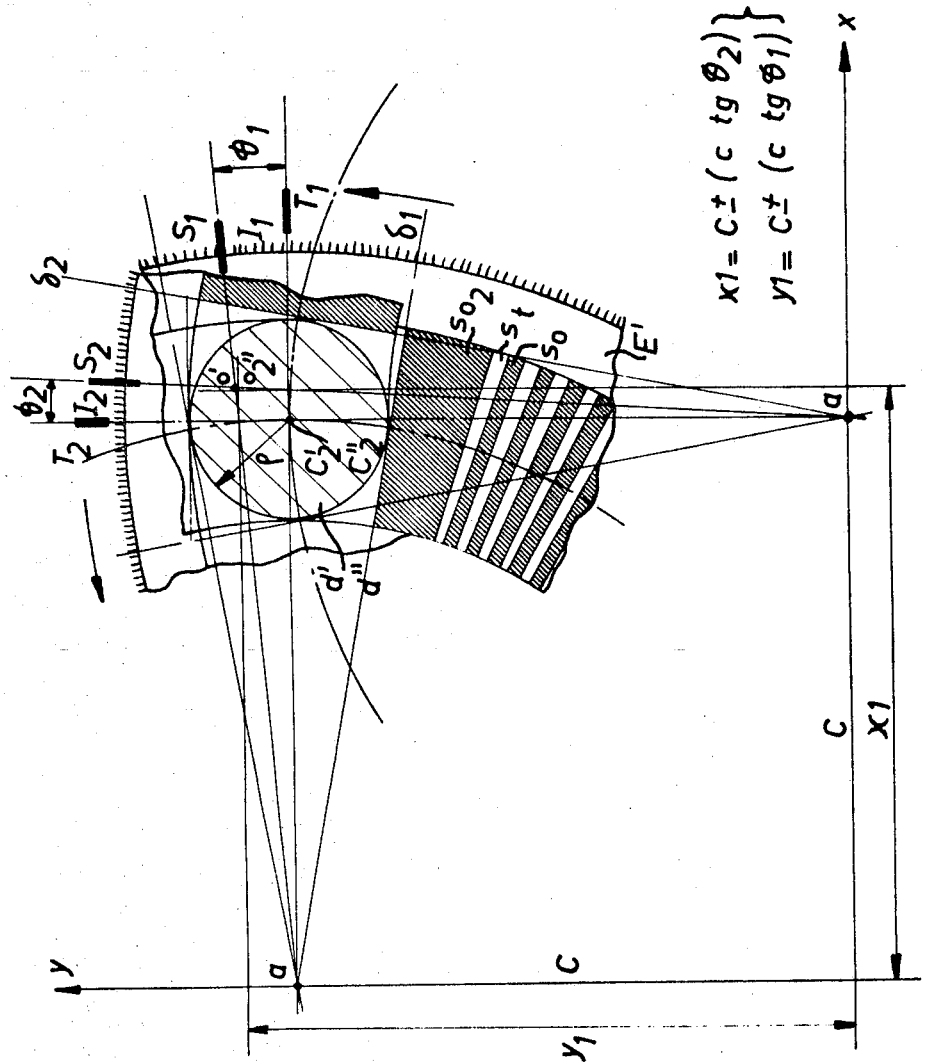

FIG. 8 is a partial schematic representation, in plan view, of the sector carrying disc and of the two detectors used in the first embodiment of the device of the invention such as illustrated in FIG. 4 and in which a simple geometric transformation has been effected to bring out more clearly the principle of the measurement according to the invention made in order to determine the two rectangular a coordinates of the position of the image.

Figure 6:
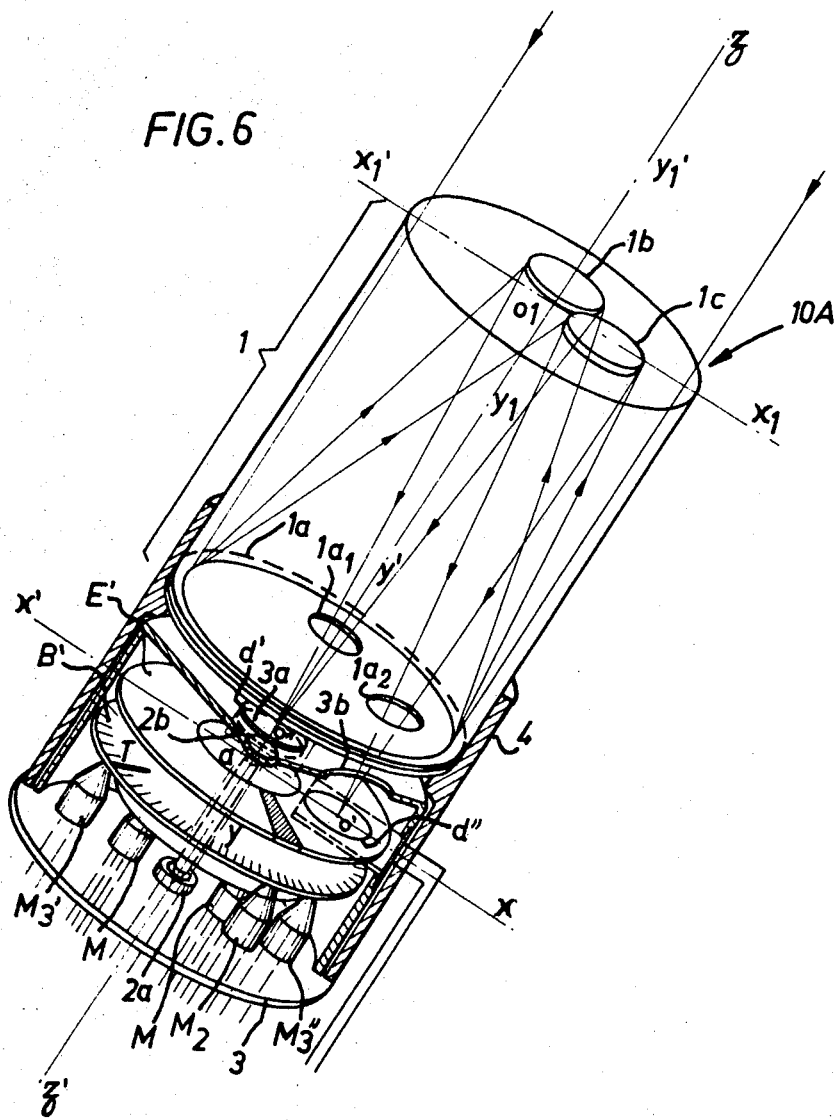
FIG. 6 is a schematic view in perspective and in partial section of the first embodiment of a sighting error measuring device according to the invention, applied to a star sight and operating in accordance with the principles illustrated in FIG. 4.
Figure 9:
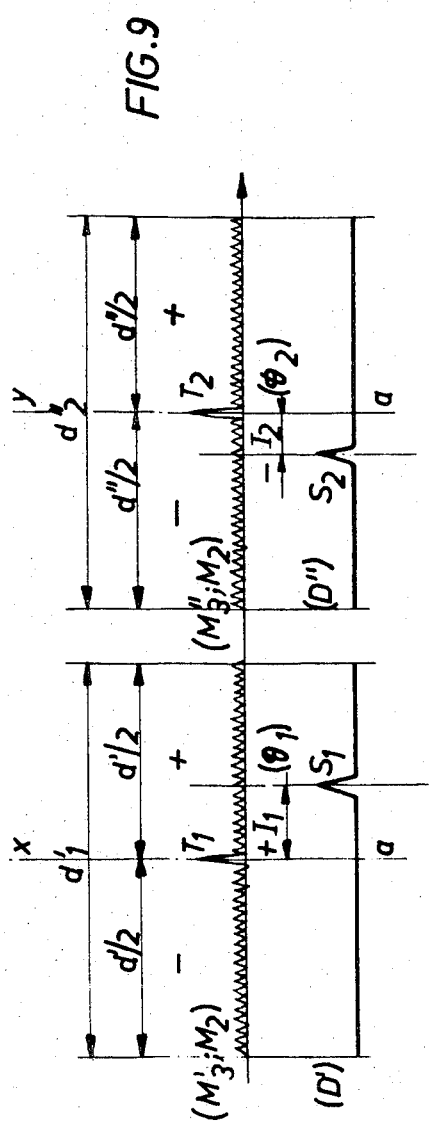

FIG. 9 is a diagram showing the various signals produced from the means used in the first embodiment of the sighting error measuring device such as illustrated in FIGS. 4, 6 and 8.

Figure 5:
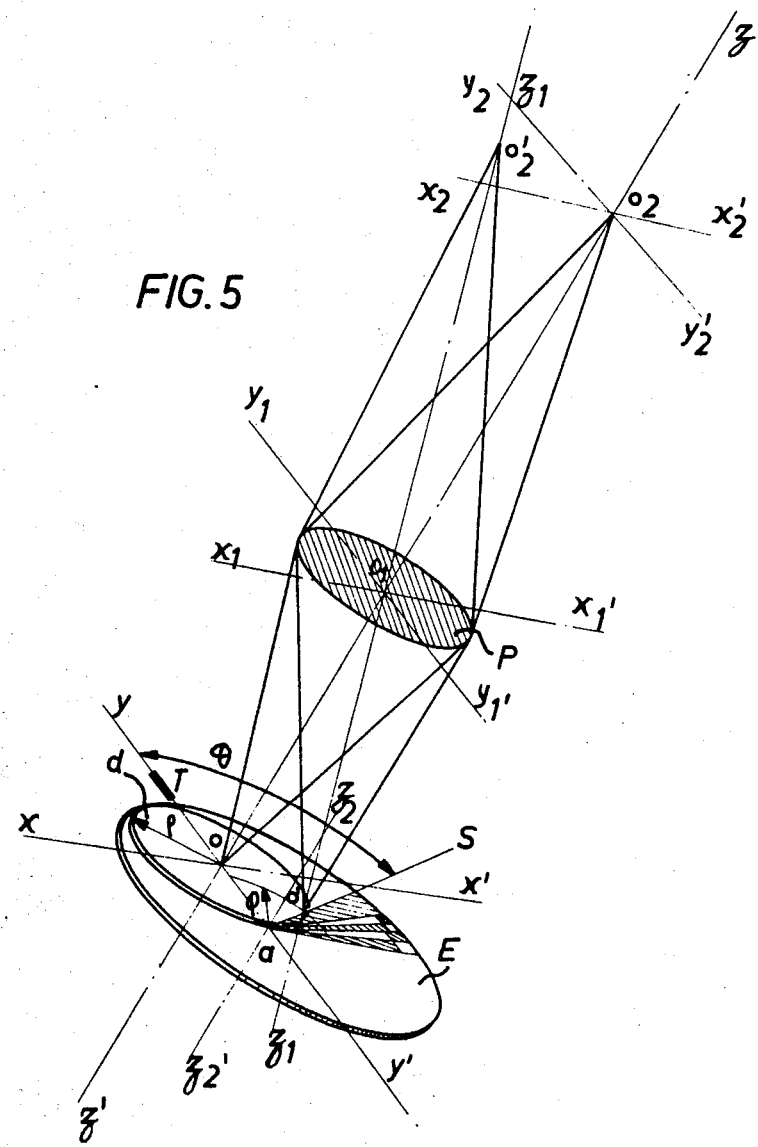
FIG. 5 is a schematic view in perspective illustrating the principle of a device for measuring the sighting error of an optical apparatus according to a second possible embodiment of the invention.
Figure 7:
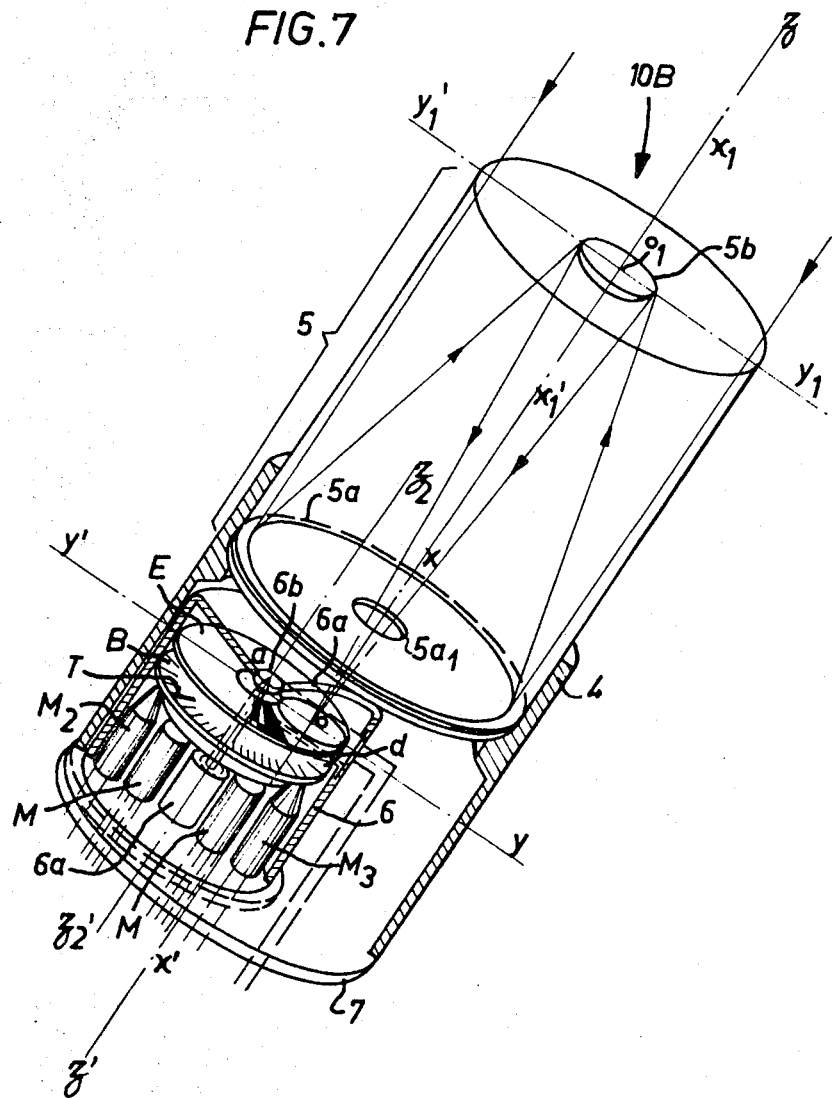
FIG. 7 is a schematic view in perspective and in partial section of the second embodiment of a sighting error measuring device such as illustrated in FIG. 5 and applied to a star sight in a similar manner to that of FIG. 6.
Figure 10:
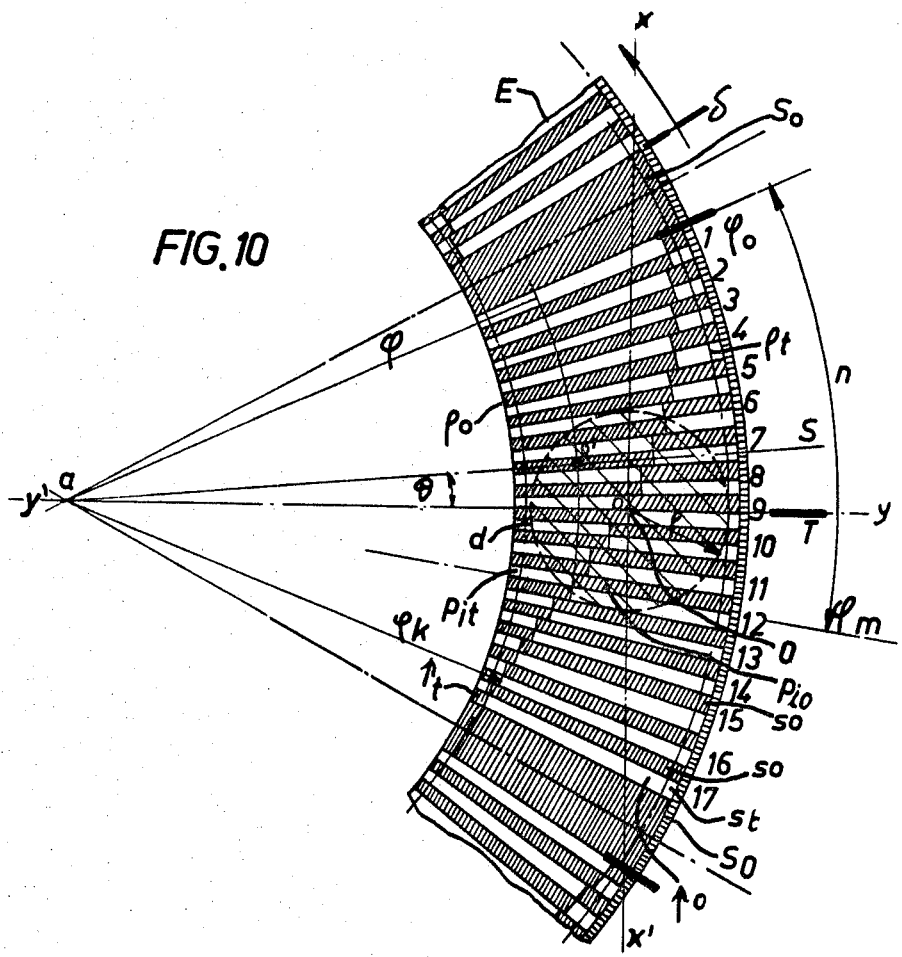

FIG. 10 is a partial, schematic plan view of the sector carrying disc used in the second embodiment of the measuring device according to the invention such as shown in FIGS. 5 and 7.

Figure 11:
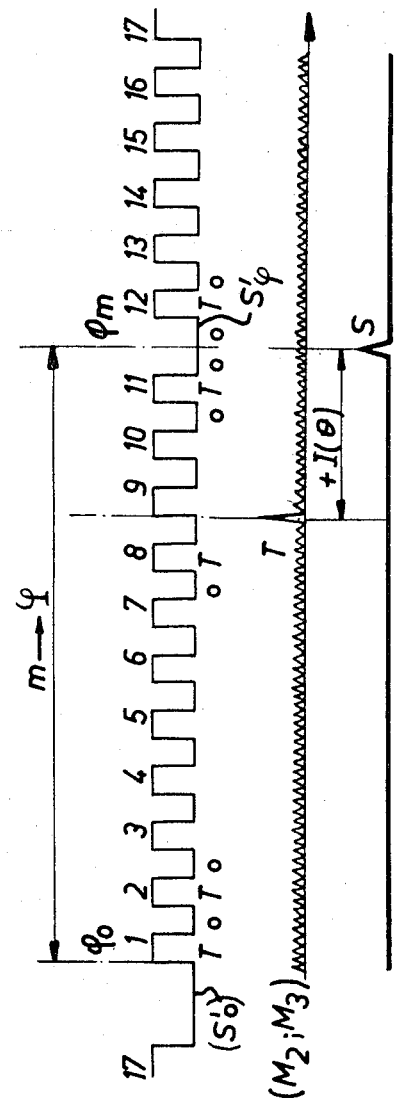

FIG. 11 is a diagram showing schematically the signals used for the analysis of the position of the image according to the second variation of the measuring method of the invention used in the embodiment illustrated in FIGS. 5, 7 and 10.

FIG. 12 is a synoptic diagram showing a possible embodiment of an electronic measuring chain which could be used for the treatment of data provided by the first embodiment of the measuring device of the invention mentioned above.

FIG. 13 is a synoptic diagram showing in a similar manner to that of FIG. 12, another embodiment of an electronic chain for the treatment of data from the measuring device according to the second embodiment of the invention as illustrated in FIGS. 7 and 10.

Figure 14:
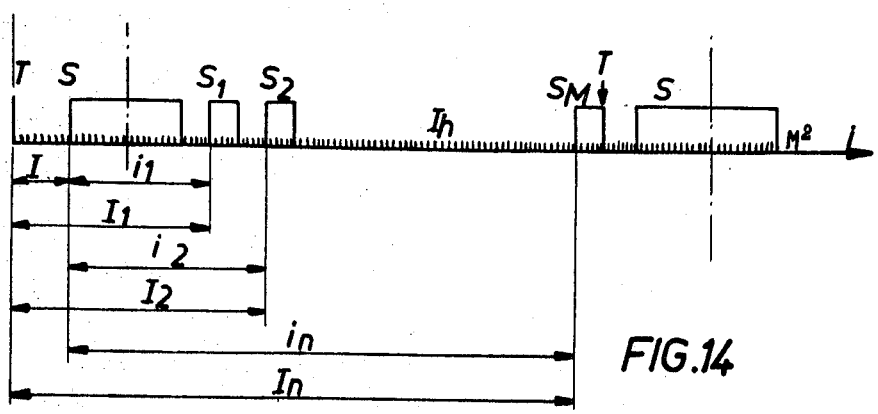

FIG. 14 is a schematic diagram intended to illustrate an advantageous variation of the above measuring method according to which repeated sighting error measurements are made by means of one or other of the embodiments shown in FIGS. 6 and 7.

Figure 1:
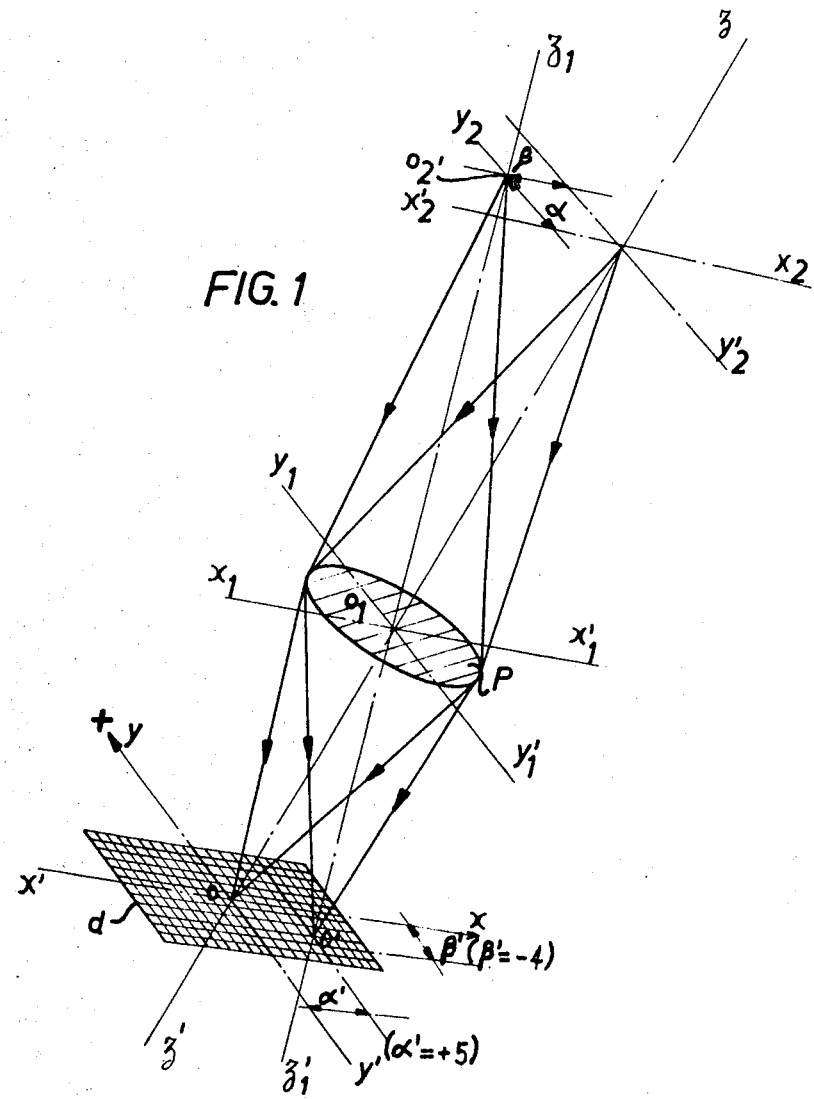
FIG. 1 is a schematic representation of the principle of measuring the sighting error of an optical device according to a known method.

Referring to FIG. 1 showing a known arrangement of the elements of a known optical device for measuring the sighting error of an optical apparatus, an optical element P representing the aforesaid sighting apparatus is centered at $O_1$ on the optical axis $z, z'$ of the system. This optical element P forms on the secondary axis $z_1, z'_1$ an image $O'$ in the focal image plane of P, of the object $O'_2$ shifted by an amount determined by the coordinates $\alpha'$ and $\beta'$ in the focal plane containing the reference axes $x_2, x'_2$ and $y_2, y'_2$. In the focal plane connected to the orthogonal reference axes $x,x'$ and $y,y'$, the shift of the image $O'$ can be determined by measuring the values of the coordinates γ' and β' of the image O' in the x, x' and y, y' axis system. This measurement can be effected in known manner by means of a detector system d containing a large number of parallel cells forming a mosaic or matrix, the said detector system d being centered at O (position of the image corresponding to zero shift) on the optical axis z,z', so that the detected coincidence of the coordinates of 0' (β'=4 and γ'= +5 in the example shown in FIG. 1) provides the indication of the position or amount of the sought shift or sighting error. In such an arrangement illustrated in FIG. 1, it will be clearly seen that the divergences or amplitudes Δx and Δy, resulting from the necessarily large dimensions of the individual cells of the detector system d, will produce a relatively low resolution power.

Figure 2:
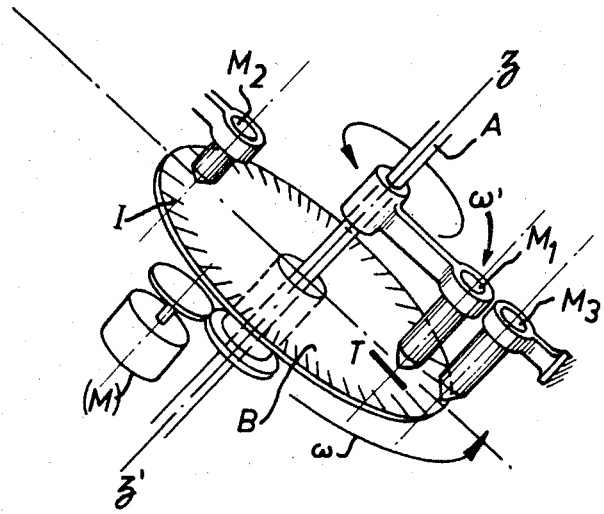
FIG. 2 is a schematic view in perspective of an apparatus enabling an angular measurement to be made between two points, at least one of which has a position which is variable as a function of the time.
Figure 3:
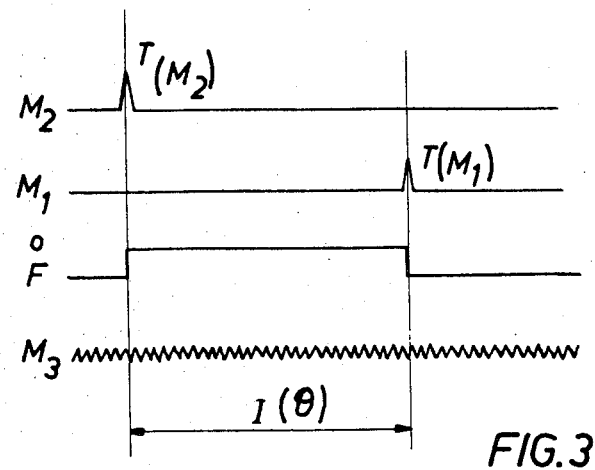
FIG. 3 is a diagram intended to show the principle of an angular measurement made by an apparatus of the type shown in FIG. 2.

Referring to FIGS. 2 and 3, these illustrate the principle of a very accurate angular measurement used in the embodiments of the sighting error measuring device of the invention described below, the apparatus shown in FIG. 2 particularly enabling the variable angle between two sides of a triangle of which two of the apices have a position which varies as a function of time to be measured.

Such an apparatus (FIG. 2) comprises a shaft A which rotates at an angular velocity ω' about the axis z,z' and drives a detection means $M_1$ supported by an arm rigid with the shaft A; a disc B which rotates at the angular velocity ω about the same axis z,z', i.e. concentrically with the shaft A, is driven by a motor schematically represented by M. There is designated on this same FIG. 2, by $M_3$, a detection means fixed with respect to A and B, and by $M_2$, a detection means whose instantaneous angular position O with respect to M1 about the axis z,z' it is desired to measure. It is advantageous, for this purpose, to provide the disc B with a magnetic track bearing marks or magnetic signs I formed on its periphery for example, which signs run under the corresponding reading head $M_3$, while a magnetic annotation or trace T formed on the same disc B is read by the reading heads $m_1$ and $M_2$ so as to produce position fixing signals or pips $T(M_1)$ and $T(M_2)$ used for the above-mentioned angular measurement (FIG. 3). In order to provide a practical l example of the order of size of measurements which can be made, the disc B can have 2,000 signs I per mm. and a diameter of 40 mm., and this produces a train of sinusoidal pulses of a frequency of 240,000 cycles per second, or 480,000 pulses after rectification by a normal bridge rectifier, one pulse thus corresponding to an angular divergence of $$\frac{1296000}{480000} = 3''$$

of arc between two pulses acting as timing or time base pulses. Moreover, assuming that the disc B rotates at an angular velocity of 60 r.p.m. or 1 r.p.s., i.e. it makes one revolution in 1,000 ms., it will be seen that the time interval between two consecutive timing pulses (FIG. 3) will be of the order of:

$$\frac{10^6}{48 \times 10^4} = \text{about 2 } \mu s$$

The appearance of the signal T ($M_2$) causes an electronic gate to open, while the appearance of the signal T ($M_1$) causes this same gate to close, when the trace T passes respectively under the reading members $M_2$ and $M_1$. Accordingly, the number of pulses I (O) read by $M_3$ will provide the required angle O since this angle corresponds approximately to I × 3'' or to a time interval of I × 2 μs. The signal T ($M_1$) could be replaced by a signal S not connected with the rotation of the disc B provided by a luminous flux detector for example, as will be described for the embodiments of the device of the invention for measuring the sighting error of an optical apparatus. In this case, the required angle will be determined by means of the said signal S, of the signal T ($M_2$) and of the timing signals I, the elements A and $M_1$ thus being eliminated.

Reference will now be made to FIGS. 4 and 5 which illustrate diagrammatically the general principles of operation and the characteristics of the general measuring process of the invention, put into operation in the two embodiments hereinafter described.

Referring to FIG. 5 which is a schematic diagram similar in form to that of FIG. 1, a thin disc E is used having alternately opaque and transparent sectors such as described in greater detail below, the said disc E rotating about its center a located on the axis $z_2$, $z'_2$ parallel to the principal optical axis z,z' of the optical system (P) of the sighting apparatus diagrammatically represented. This disc E intercepts the image beam at O' in the immediate vicinity of the focal image plane of the optical apparatus P, this focal plane being represented in FIG. 5 by the plane formed by the two rectangular coordinate axes x,x' and y,y' having O as their center. A detector d preferably but not exclusively constituted by a rapid photodetecting cell of high sensitivity such as that described in U.S. Patent Ser. No. 684,110 of Nov. 20, 1967, filed by the present applicant, is disposed under and as near as possible to the disc E so that the center of the exploration field of the cell coincides with the point O and is situated on the optical axis of the system P. ASsuming that the disc E, which is partially shown on a larger scale in FIG. 10, has six wide opaque sectors $S_o$ of 9° of arc and that between two sectors $S_o$ there are disposed 34 small sectors $s_o$ and $s_t$ respectively and alternately opaque and transparent of width 1.5° of arc and that the disc rotates through one revolution in 1,000 ms. (60 r.p.m.), the illumination time by the beam of the cell d between the passage of two narrow opaque sectors will be $$\frac{1000 \times 1.5}{360} = 4 \text{ ms.}$$

so that the complete period of the pulses of the signal provided by the detector and corresponding to the passage sequence of the narrow sectors $s_o$ and $s_t$ interrupting and restoring the illumination of the cell d will be 4 × 2 = 8 ms. (FIG. 11).

As shown in FIG. 10, the narrow sectors $s_o$ and $s_t$ have for the same sector two areas $p_o$ and $p_t$ respectively opaque and transparent; the line of separation ρk of the two aforesaid areas moves backwards and forwards according to a predetermined law as a function of the position K of the corresponding sector. In the case illustrated by way of example in FIG. 10 this line φk moves to the outer edge of the disc upon passing from one sector to the other when the disc E turns in the trigonometric direction.

Thus, when the beam of light encounters the separation surface of the two respectively transparent and opaque areas $p_{it}$ and $p_{io}$ of one of the narrow sectors in position i of the disc E, such that the said surface of separation corresponds to the polar radius ρ of the image O', there is produced a discontinuity or inversion in the alternation of the pulses (in the form of square waves in the example described) of the signal produced by the detector d, this inversion constituting an anomaly S'100 (FIG. 11) of which the fixed position in the signal emanating from the detector d enables the length of the polar radius Φ which constitutes one of the required coordinates of the image O' in a system of reference axes whose center coincides with the center a of rotation of the disc E to be distinguished. The value of Φ can advantageously be measured for example (FIG. 11) by the time interval or number m of timing pulses separating the passage through O' of the edge of a wide opaque sector s o (position $s'_o$ in the signal from the detector) from the appearance of the above-mentioned anomaly s' Φ (FIG. 11). Thus, in FIG. 11 and in the example envisaged, the time interval separating s40 $_o$ from s'Φ is m × 4 × 2 ms., or where m = 11, 11 × 4 × 2 = 88 ms.

It has been assumed that in FIGS. 10 and 11 the pip T or initial position fixing signal is produced at the moment when the corresponding trace or magnetic impression T (see hereafter) on the disc B bearing the magnetic impressions producing the timing signals, coincides with the reference axis ay associated with the plane of the detector d. In these circumstances, the other polar coordinate or azimuth O of the image O' can be measured by the time interval or number of pulses I (O) separating the above-mentioned position fixing pip T from the appearance of the detection signal S (FIG. 11) constituted from the impression or discontinuity S'Φ in the signal coming from the detector d. In the example taken here the angle O will correspond to I × 3" of arc.

It follows that the continuous variation of the backwards and forwards movement of the lines of separation Φk of the opaque and transparent areas of the corresponding sectors can be effected according to any law, careful choice of this variation enabling, as the case may be, an equally accurate angular and radial determination of the image position to be obtained throughout all the regions of the field to be explored. Thus, the knowledge of the two polar coordinates Φ and Θ of O' enables the position of the image O' in the chosen axis system associated with the detector d to be defined.

Reference will now be made to FIG. 4 which illustrates the principles of another variant of the measuring process of the invention which is used with the embodiment of the measuring device shown in FIGS. 6 and 8. In FIG. 4 there is shown at P' an optical sighting apparatus in which the image of a luminous object $O_2$ is duplicated by means of an appropriate optical element into two images O', O" disposed in perpendicular directions respectively on the axes aO', aO", the images O', O" being formed respectively from two distinct beams. When there is no sighting error (object $O_2$ accurately centered on the optical axis z,z' of the apparatus P') the two images O', O" are formed respectively at the centers $C'_2$, $C''_2$ of two corresponding detectors d', d" having the same radius ρ, the centers $C'_2$, $C''_2$ being disposed in perpendicular directions respectively on the reference axes x,x' and y,y', having the same center a as the center of rotation of a thin disc E' which has opaque and transparent sectors, such as that shown in FIG. 8. Thus, the images O', O" of the sighted object $O_2$ are projected respectively onto the corresponding surfaces of two fields d', d" of the same radius ρ, in such a way as to cover the maximum optical field prescribed for the sighting apparatus. The detectors d', d" can also in this case be advantageously but not exclusively constituted by two photoelectric cells such as those described in French Patent Application No. 84.380 of Nov. 21, 1966, filed by the present applicant. These detectors are disposed moreover under the disc E', so that the centers $C'_2$, $C''_2$ of the corresponding fields are located respectively on the axes x,x' and y,y' and at an equal distance C from the center of rotation a of the disc E'.

The disc E' is shown diagrammatically in FIG. 8 disposed in the immediate vicinity of the focal image plane of the optical element P'. For the sake of clarity in FIG. 8 and to simplify the description, two translations of length C of the reference axes have been effected in the perpendicular directions x,x' and y,y', so that the two fields d',d" of radius ρ of the corresponding detectors are merged, their respective centers C $c'_2$ and $c''_2$ being at an equal distance C from the axes x,x' and i y,y'.

Assuming, on the other hand, that the disc E', partially shown to a larger scale in FIG. 8, has a single wide opaque sector $s_{o2}$ or 13.5° of arc and 115 small opaque sectors $s_o$ alternating with 116 small transparent sectors $s_t$ of the same width, of 1.5° in the example taken, and that this disc rotates, as in the previous case, at an angular velocity of 60 r.p.m. i.e. one revolution in 1,000 ms., it will be seen that the illumination time between the passage of two narrow opaque sectors will again be:

$$\frac{1,000 \times 1.5}{360} \simeq 4 \ ms.$$

and that the average time interval separating the exploration of the two fields d' or d" will be 1,000/4 = 250 ms.

In the present embodiment (FIG. 9) the fixing pips $T_1$ and $T_2$ are delivered respectively at the instant of coincidence of the axes a $δ_1$ and a $δ'_2$ defining the leading edge of the wide opaque sector $s_{o2}$ with the axes ax and ay respectively (FIGS. 8 and 9); in the same way as in the previous embodiment, the detection signals $S_1$ and $S_2$ are produced from the signal train emanating from the corresponding detectors d'd" when the beams forming the corresponding images are interrupted at the points $O'_2$, $O''_2$, by the same edge a $δ_1$ of the wide opaque sector $s_{o2}$. The angle $Θ_1$ formed by the axis ax with the direction a$δ_1$ of the image $O'_2$, and the angle $O_2$ formed between the axis ay and the direction a$δ_2$ of the image $O''_2$ are in this case proportional respectively to the numbers $I_1$ and $I_2$ of timing pulses separating the signals $T_1$ and $S_1$ on the one hand and $T_2$ and $S_2$ on the other hand, $T_1$ and $T_2$ being taken as fixing reference signals for counting; in the example illustrated in FIGS. 8 and 9 the following equations apply:

$$Θ_1 = I_1 × 3''$$

$$Θ_2 = I_2 × 3''$$

Referring more particularly to FIG. 8, and assuming that C is a constant corresponding to the distance between the center of rotation a of the disc and the center of one or the other of the fields or detectors d', d", it will be seen that the rectangular coordinates $x_1$, $y_1$ of the point image (or the two sought sighting error components) in the axis system x'x, y'y are provided from the measured angles $Θ_1$ and $Θ_2$ by the two following equations (1) $x_1 = C ± (C \tan Θ_2)$ (2) $y_1 = C ± (C \tan Θ_1)$ There will now be described with reference to FIGS. 6 and 7 two preferred embodiments of a device for measuring the sighting error of an optical apparatus putting into practice respectively the principles of the two aforesaid variants of the measuring process of the invention.

These two embodiments advantageously solve the particular problem of "star sighting" notably on an artificial observation satellite, and solve in a general manner the similar problems which arise each time an accurate sighting is required in an optical apparatus. To this end, the present invention provides, by way of new industrial products, star sights or telescopes equipped with devices according to the invention for measuring the sighting error and adapted to be mounted on an artificial satellite, when it is desired to aim the said sight or observation telescope at a particular star. Any error introduced by this sight must be less than 1', corresponding to the maximum admissible angle between the controlled direction of the telescope axis and the real direction of the latter, taking into account the type of telescope used.

On the other hand, the nature and characteristics of the reference stars chosen for such a sight imply that the latter shall have as large a field as possible, at least equal to 1° squared, namely ± 30' in all the directions, and this necessitates an intrinsic accuracy of the sight of the order of 1/200 of the field (i.e. about 10'') in order that, taking into account all the successive errors, there can be obtained an absolute minimum accuracy of 1' on the direction given to the axis of the observation telescope.

Moreover and in this same case, for an optical element of 5cm. diameter for example, providing images whose positions vary within an area of 1 cm.², when the axis of the optical element scans a field of 1° squared, it can be assumed that a flux of 45,000 photoelectrons/second will be obtained for a star of magnitude O, taking into account the yields of the optical element, or the photocathode of the detector and of the mechanical parts of the apparatus.

Thus for example, the photodetector cell in accordance with Patent Ser. No. 684,110 of Nov. 20, 1967, filed by the present applicant, and mentioned above, can produce a signal S suitable for the case considered, at each interruption of the optical beam by an opaque sector, these signals being suitable for use in accordance with the variants of the measuring process already described in the two aforesaid embodiments of the invention.

In FIG. 6 there is shown a sight 10A in accordance with the invention, equipped with a sighting error measuring device a as that illustrated in FIGS. 4 and 8 and described above. This apparatus is essentially constituted by an assembly 1 of the "Cassegrain" type (the "Gregory" type or any other similar optical system may also be used) which has a concave reflecting surface $1a$ concentric with the optical axis $z,z'$, and two convex reflecting surfaces $1b$, $1c$. The beam of light passes through two openings $1a_1$ and $1a_2$, so as to illuminate respectively the two detectors $d'$, $d''$. The sectored disc E, shown in FIG. 8, and the disc $B'$ which carries the magnetic signs are driven together concentrically about the axis $z,z'$, synchronously or asynchronously by means of the magnetic field produced by two windings M. They are rotatably mounted on two pivots $2a$, $2b$ either of rubies of the type used in watchmaking, or of double ball race precision ball bearing type, so as to avoid any possibility of seizure, the rotation spindle being mounted moreover on the casing 3. This latter is provided with openings $3a$ and $3b$ for the passage of the corresponding optical beam and it carries three magnetic reading heads $M_2$, $M'_3$ and $M''_3$ respectively for reading the timing signals, the fixing pips and the respective signals emanating from $d40$ and $d''$ these three leads being disposed beneath the disc $B'$. A support 4 receives the optical assembly 1 together with the casing 3 and enables the whole apparatus to be mechanically centered and easily dismantled. The electrical connections for connection to the electronic processing chain described above for the pips, signals and pulses, emerge from the casing 3.

In FIG. 7 the sight 10B which employs the second aforesaid embodiment of the sighting error measuring device of the invention is essentially constituted by a "Cassegrain" type assembly (the "Gregory" type or any other similar optical system also being suitable), which has, concentric with the axis $z,z'$, a concave reflecting surface $5b$, so that the beam of light passes through an opening $5a_1$ so as to illuminate the detector $d$. The sectored disc E and the disc B which carries the magnetic signs are concentrically driven about the axis $z,z'$, synchronously or asynchronously by means of a magnetic field produced by two windings M and they are mounted on two pivots $6a$, $6b$ of rubies of the type used in watchmaking for example or in accordance with any other appropriate known technique, the said pivots $6a$, $6b$ being fixed to a casing 6 provided with an opening $6a$. The reading heads $M_2$, $M_3$ are fixed to the casing 6 and disposed beneath the disc B. A support 4 receives the optical assembly 5 together with a plate 7 on which is fixed the casing 6, and this enables the whole apparatus to be centered and easily dismantled. The electrical connections for connection to the electronic processing chain described above emerge from the casing 6.

In an advantageous form of the two above-described embodiments of the sights 10A and 10B respectively, the optical system if formed in a silica block whose reflecting surfaces are processed in the usual manner. The casing and supports can also be formed from a light resistant material such as beryllium or titanium etc. Assembly of the different parts of the sight is then effected by resin glueing, while a metallic, flexible, magnetic disc is used in order to avoid excessive friction with the corresponding readers, and the reading heads used are preferably covered with "Teflon."

Reference will now be made to FIGS. 12 and 13 which respectively illustrate diagrammatically an electronic chain for processing the information provided by each of the embodiments of the device of the invention for measuring the sighting error of an optical apparatus.

In FIG. 12 which relates to the processing of the data provided by a device of the invention, such as illustrated in FIGS. 7, 10 and 11, the discriminator D receives at its inputs the signals or data emanating, on the one hand, from the reading heads $M'_3$ (fixing pip $T_1$) and $M''_3$ (fixing pip $T_2$) and the magnetic reading head $M_2$ (timing signals $I_h$) and, on the other hand, from the detectors $d'$ and $d''$ associated with appropriate filters, the whole of which assembly is designated by $D'$ and $D''$, for constituting respectively the detection signals $S_1$ and $S_2$ (FIG. 9) enabling two coordinates to be determined which provide the position of the image or the divergence characteristic of the sighting error.

Moreover, in the process of the invention for measuring the sighting error of an optical apparatus, it is advantageous, particularly when sources (or stars) of very weak luminosity are to be detected, for which the distribution of photons received by the optical apparatus is uncertain, to carry out a measurement by integration of a large number $n$ of measurements in order to reduce the error in the image position, as is illustrated in FIG. 14.

If it is assumed first of all in effect (FIG. 14) that the commencement of the signals S, $S_1$, $S_2$....$S_n$ which correspond to the appearance of an opaque sector in the light beam coming from the sighted object can be detected without error, the number of timing pulses between the initial pip T and the commencement of the signal S defines the angular position of the star and the number $I_1$ of timing pulses between the pip T and the signal S1 is then such that:

$I_1 = I_o + i_1$; similarly: $I_2 = I_o + i_2$; ....$I_n = I_o + i_n$
and $I_o + I_1 + I_2 .... + I_n = (n+1) I_o + (i_1 + i_2 .... + i_n)$ Now, $$\sum_{I_0}^{I_n} I$$

can easily be determined (by means of counting registers for example) and by performing at the end of the operation the subtraction of the constant number $$\sum_{i_1}^{i_n} I$$

so that the following equation is obtained:

$$\sum_{I_0}^{I_n} I - \sum_{i_1}^{i_n} i = n I_0$$

This is equivalent to performing the measurement of $I_o$ $n$ times.

It is of course possible in the same way to perform similar measurements at the end of the signals S, $S_1$, $S_2$....$S_n$ so as to double the number of position measurements, which measurements can be processed analogically of by means of a numerical analogical system.

Thus, in FIG. 12, $C_R$ designates a usual register counting unit performing the above operation $$\sum_{I_0}^{I_n} I - \sum_{i_1}^{i_n} i = n I_0$$

so that at the output of the discriminator D square waves $I_{\theta 1}, I_{\theta 2}$ are obtained whose durations are respectively proportional to the coordinates $\Theta 1, \Theta 2$ characteristic of the instantaneous divergence due to the sighting error.

After application to known control elements, the output signals $I_{\theta 1}, I_{\theta 2}$ will permit an accurate correction of the said sighting error, which correction will be obtained moreover when the images $O'_2$, $O''_2$ are formed at the center of or in the immediate vicinity of the center of the fields $d'$, $d''$ of the corresponding detectors.

Fig. 13 illustrates schematically and in similar manner a possible embodiment of an electronic chain for processing the information emanating from a sighting error measuring device according to the invention such as described above with reference to FIGS. 7, 10 and 11. In FIG. 13, $d$ represents the detector and SA a filter for constituting the detection signals S (FIG. 11). At the output of the discriminator D square waves $I_\theta$ and $I\Phi$ are obtained whose widths are proportional to the polar coordinates $\Theta$ and 100 referred to above. The method described above for determining by integration of $n$ measurements of the values $\Theta$ and $\Phi$ can also be used advantageously in this case.

The present invention has been described and shown purely by way of explanation and not in limiting manner and any variation can be made thereto without exceeding its scope.

Thus, the images of several luminous sources can be formed on several detectors with one or more analyzing discs, or sighting of the sighting apparatus can be performed on sources forming images which are not pinpoint by detecting the right-hand, left-hand, upper and lower edges of the image. In the same way and for the purpose of simplifying the image duplicating optical element, it is possible to scan a single image in two orthogonal directions by two conveniently disposed discs, the rotations of which are mechanically synchronized by gearing for example.

It is clear that the process of the invention is suitable for a large number of applications and that each solution only depends on the kind of problem to be resolved.

Thus, the number and form of the sectors and the law according to which their opacity varies, the speed of rotation of the disc or discs, the manner of obtaining the pulses constituting the time base and the duration thereof, the directions of the reference axes located in the focal plane, the arrangement and configuration of the optical element, the detector type, the electronic equipment used for processing the information, the nature of the materials constituting the various elements and lastly the structure of the sighting devices constituted may be of any kind.

I claim:

1. A method of measuring the sighting error of an optical apparatus, i.e. the instantaneous divergence between the direction of a sighted object and the optical axis of the apparatus, including a star sight for artificial satellites, said method comprising sighting a star, forming the image of said star in the focal image plane of said optical apparatus, effecting a detection of the luminous flux from said image, effecting a regular interception of said luminous flux, creating a pulsed reference time base, comparing said luminous flux detection with said time base, taking an initial time in said base at the same time as making an initial detection, creating an anomaly be breaking the regular mark/space course of the signal in said regular interception causing a signal inversion therein, angularly measuring, with said time base as a reference, the time which elapses between two anomalies, angularly measuring the time which elapses between the initial time of the time base and an anomaly and comparing the sum number of the two measurements after integration of a constant number $n$ of measurements, whereby the sighting error measurement is obtained.

2. A method of measuring the sighting error of an optical apparatus, i.e. the instantaneous divergence between the direction of a sighted object and the optical axis of the apparatus, including a star sight for artificial satellites, said method comprising sighting a star, forming two images of said star whose centers are located at 90° from each other in the focal image plane of said optical apparatus, effecting a detection of each of the luminous fluxes from each of said images, effecting a regular interception of each of said luminous fluxes, creating a pulsed reference time base, comparing each detection of each luminous flux with said time base, taking an initial time in the time base at the same time as making an initial detection, creating an anomaly by breaking the regular mark/space course of the signal in each of said regular interceptions causing a signal inversion therein, angularly measuring, with said time base as a reference, the time which elapses between the initial time of the time base and an anomaly for each of the two luminous fluxes, and comparing the sum number of the two measurements after integration of a constant number $n$ of measurements, whereby the sighting error measurement is obtained.

3. A method of measuring the sighting error of an optical apparatus, i.e. the instantaneous divergence between the direction of a sighted object and the optical axis of the apparatus, including a star sight for artificial satellites, said method comprising sighting a star, forming the image of said star in the focal image plane of said optical apparatus, effecting a detection of the luminous flux from said image, effecting a regular interception of said luminous flux, creating a pulsed reference time base, comparing said luminous flux detection with said time base, taking an initial time in said time base at the same time as making an initial detection, creating an anomaly by breaking the regular mark/space course of the signal in said regular interception causing a signal inversion therein, angularly measuring, with said time base as a reference, the time which elapses between the initial time of the time base and a first anomaly on the one hand, and the initial time of the time base and a second anomaly on the other hand, and comparing the sum number of the two measurements giving the analysis of the image position in polar coordinates after integration of a constant number $n$ of measurements, whereby the sighting error measurement is obtained.

4. A device for measuring the sighting error of an optical apparatus, including a star sight for artificial satellites comprising a thin disc having alternately opaque and transparent sectors and turning at a constant speed, the said disc being disposed in the immediate vicinity of the focal image plane of the optical apparatus, so as to intercept the image beam thereof, a second disc rigid with the first, disposed below it and supporting a magnetic track having regularly spaced magnetic traces separated by areas of nonmagnetic support onto which are impressed the regular magnetic traces or fixes read by a reading member so as to provide timing pulses, the said magnetic track carrying disc being rigidly driven in rotation with the first disc having the opaque and transparent sectors and the said magnetic track moreover having at least one fix or trace in order to constitute an initial position fixing signal, and at least one detection means or cell disposed in the immediate vicinity and beneath the disc having opaque and transparent sectors, the said detection means being associated with at least one reading member so as to furnish a detection signal which is variable as a function of the rotation of the disc having opaque and transparent sectors controlling the illumination produced on the said detection means or cell.

5. A device for measuring the sighting error of an optical apparatus, including a star sight for artificial satellites, comprising a single cell, the center of which is situated on one of the reference axes determined by the direction of a sighted object and the optical axis of the apparatus and of which the position fixing signal determining the instant corresponding to the beginning of the measurement is produced when the corresponding mark or trace on the magnetic track, having regularly spaced magnetic traces separated by areas of nonmagnetic support, coincides with the said axis, a thin disc having alternately opaque and transparent sectors and of which at least one of the opaque sectors constitutes a wide sector interrupting the luminous flow onto the cell so as to cause a first discontinuity in the detection signal, while the other opaque and transparent sectors are all of the same width but have an opaque zone and a transparent zone along the radial length of a same sector, the surface of the respective opaque and transparent zones varying from one sector to another in a continuous manner, such that the signal emitted by the said cell has a second discontinuity, formed by inversion of the signals produced by the detector upon passage of the sector whose surface of separation between the two opaque and transparent zones corresponds to the radius with respect to the rotation axis of the image position, such that from the position fixing signal and/or from the signal produced by the appearance on the cell of a wide opaque sector, the two polar coordinates of the position of the image on the single cell of the device are determined.

6. A device for measuring the sighting error of an optical apparatus, including a star sight for artificial satellites, comprising a thin disc provided with sectors of the same width alternately and regularly opaque and transparent and with at least one wider opaque sector, in particular enabling the production of a discontinuity in the sequence of pulses due to the other above-mentioned sectors by breaking the regular mark/space course of the pulses causing a signal inversion in the alternation of the sequence of pulses, detection means including two photoelectric cells, the respective centers of which are disposed in perpendicular directions, in the immediate vicinity of and under the disc having opaque and transparent sectors, each of the said cells producing a distinct detection signal associated with an initial position fixing signal, such that, by measuring the corresponding divergences between the said position fixing signals and the discontinuities of the detection signal, two rectangular coordinates of the position of the image furnished by the optical apparatus can be determined.

7. An optical system of an optical sight or telescope intended particularly for sighting stars, notably on an artificial satellite, and in general manner an optical sighting apparatus provided with a sighting error measuring device, constituted by the assembly, mounted in a single unit, of optical means for constituting said sight and a device for measuring the sighting error, essentially comprising a thin transparent disc having alternate opaque and transparent sectors, which disc rotates about a center disposed on the optical axis of the system, and two detectors disposed orthogonally and receiving two duplicated images of a star emanating from the optical system, a disc carrying magnetic signals and driven fast in rotation with the first disc about an axis parallel to or merged with the optical axis of the system, a motor device preferably constituted by two windings for driving said two discs, and an assembly of reading heads providing, on the one hand, timing signals from said detectors reading said magnetic signals and position fixing pips to determine the instant corresponding to the beginning of the measurement, and on the other hand, detection signals emanating from each of the two detectors of the sighting error measuring device varying as a function of illuminations from said images.